GEORGE PRINTUP, OF LYNCHBURG, VIRGINIA.

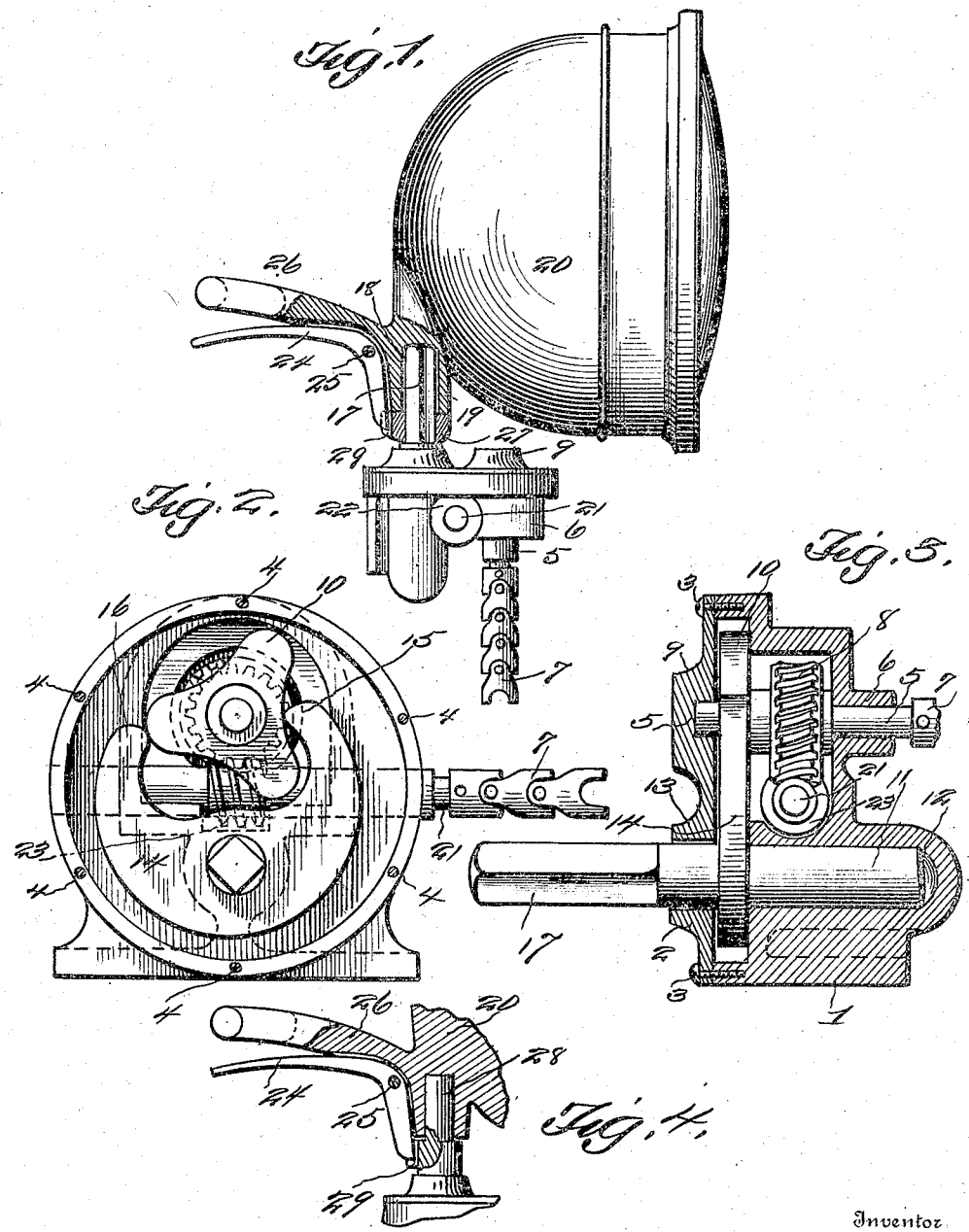

LAMP-OSCILLATOR.

No. 923,998. Specification of Letters Patent. Patented June 8, 1909.

Application filed February 23, 1909. Serial No. 479,642.

*To all whom it may concern:*

Be it known that I, GEORGE PRINTUP, a citizen of the United States of America, and resident of Lynchburg, in the county of Campbell and State of Virginia, have invented certain new and useful Improvements in Lamp-Oscillators, of which the following is a specification.

This invention relates to certain new and useful improvements in means for supporting a lamp on an automobile or other vehicle.

It has for its objects among others to provide simple and cheap means for constantly vibrating or oscillating the lamp in a plane across the path traversed by the vehicle. The construction is such that this oscillatory motion is obtained by connection with some moving part of the vehicle, as, for instance, the axle, although the invention is in no wise restricted to the means for deriving the motion from the vehicle or the part of the vehicle from which the motion is transmitted.

A further object of the invention is to provide simple and efficient means whereby a plurality of drives are obtained whereby the speed or frequency of the oscillation may be varied according to required conditions or circumstances.

A further object of the invention is to provide simple means whereby the lamp may be allowed to remain stationary, as, for instance, during the daytime or at other times notwithstanding the continuous movement of the parts by which the lamp is given its oscillatory motions when desired.

Still a further object of the invention is to provide against wabbling or motions of the lamp due to the movement of the vehicle other than the positive oscillation obtained by the mechanism soon to be described.

Other objects and advantages of the invention will hereinafter appear and the novel features thereof will be particularly pointed out in the appended claims.

The invention is clearly illustrated in the accompanying drawings, which, with the numerals of reference marked thereon, form a part of this invention, and in which—

Figure 1 is a side elevation of a lamp and oscillator with a portion broken away, showing my improvement. Fig. 2 is a plan view thereof with the lamp removed. Fig. 3 is a sectional detail of the oscillator with parts in elevation. Fig. 4 is a sectional detail of a portion of the lamp and its support, showing the modified form of means for holding the lamp against oscillation when desired.

Like numerals of reference indicate like parts throughout the several views.

Referring to the drawings, 1 designates a casing within which the operating parts are contained. This has a removable cap 2 held in place by any suitable means as screws 3 or the like engaging openings 4 in the casing.

5 is a shaft having a bearing in a boss 6 on the casing and this shaft is designed to derive its power, so as to be continuously rotated during the movement of the vehicle, in any suitable manner. In the present instance, I have chosen to show a flexible shaft 7 of any suitable nature and which is designed to be connected in any convenient or well-known way with some moving part of the vehicle, as, for instance, the axle, so that the said shaft shall be continuously revolved as long as the vehicle is in motion. Any other means, however, may be employed for imparting such continuous rotation to the shaft and such means may derive power from any moving part of the vehicle.

8 is a worm gear on said shaft 5, which shaft is extended and has a bearing in a boss 9 on the cap 2 of the casing, as seen best in Fig. 3. On this shaft 5, within the casing, is a cam 10 which may be given any desired shape suitable for the purpose, that herein illustrated having been found a most efficient one.

11 is a shaft mounted to oscillate in a suitable bearing 12 in the casing and a suitable bearing 13 on the cap, and upon this shaft is the oscillator 14 which is preferably of the shape seen in Fig. 2, and between the arms 15 and 16 of which the cam 10 operates. This shaft 11 is shown in Figs. 1 and 3 as having its upper end polygonal in form, as shown at 17, and this polygonal end is received in a socket 18 in the depending collar 19 of the lamp 20, which latter may be otherwise of any well-known or approved form of construction.

The operation will be readily understood. With the parts constructed and arranged as shown and described and the lamp locked in position so as to take the movements given to the oscillator, and the shaft 5 being connected by the flexible shaft, or other means, with some moving part of the vehicle, as the vehicle is put in motion, the shaft 5 is continuously rotated and this continuous rotation moves the cam 10 continuously in one direction, but this continuous rotation of the cam imparts to the oscillator 14 a back and forth or oscillatory motion, as will be readily understood. The worm 8, in this instance, serves no function, and, if but one drive is desired, this worm need not be present. This worm, however, serves an important function in that when it is desired to change the speed or frequency of the oscillation of the member 14 and consequently of the lamp, it is accomplished as follows. 21 is a shaft having a bearing in a boss or the like 22 on the casing and extending, in this instance, at substantially right angles to the shaft 5. This shaft likewise is designed to receive continuous motion during the movement of the vehicle by any suitable means as the flexible shaft 7 connected with the axle or some other moving part. On this shaft is a worm 23 which meshes with the worm gear 8 so that when motion is given to the shaft 21, this motion, through the medium of the worm 23 and the worm gear 8, is imparted to the shaft 5 and consequently to the cam 10 and to the oscillator 14. The oscillations given by the rotation of the shaft 21, through the medium of the worm and worm gear will be much slower than when the drive is direct through the medium of the shaft 5 alone. The same flexible shaft or power imparting means may be used for both drives, as will be readily understood.

It is to be noted that by the particular construction and formation of the cam and oscillator, the contact points of the two arms 15 and 16 are always opposite each other and these two arms are always in contact at the same time with the cam so that there is absolutely no lost motion and hence no wabbling of the parts can take place.

In order to be able to throw out the lamp when necessary so that it shall not have imparted thereto the oscillatory motion of the member 14, any suitable means may be provided, for instance, as seen in Fig. 1, wherein 24 is a lever pivoted at 25 on an arm or projection 26 on the lamp body and designed to engage in a notch or the like 29 in a boss 27 rigid with the shaft 17 so that when the lever is in engagement with the notch, the boss 19 and the member 27 will be locked so as to move together, but, when the lever is thrown so as to bring its lower end out of engagement with the notch 26, the member 27 oscillates not imparting its motion to the lamp, it being understood that the socket 18 is circular so as to allow the portion 17 of the shaft to turn therein, without giving motion to the lamp. This is but one of the many ways that may be devised for locking and unlocking the lamp, for instance, in Fig. 4 I have shown another form. In this figure, the upper end of the shaft 11 is made round, as seen at 28, and the shaft has a notch or the like 29 into which the end of the lever is engaged when it is desired to lock the shaft and lamp so that the latter will be oscillated.

From the above, it will be seen that I have devised a simple, yet durable and efficient form of mechanism for giving continuous oscillatory motion to the lamp, and, while the structural embodiment of the invention as herein disclosed is what I at the present time consider preferable, it is evident that the same is subject to changes and modifications in detail, proportion of parts etc., and I therefore do not wish to restrict myself to the detailed construction herein disclosed, but reserve the right to make such changes, variations and modifications as come properly within the scope of the protection prayed.

What I claim as new is:—

1. An oscillatory member arranged in a horizontal plane, a lamp support rigid therewith, and means connected with some moving part of a vehicle for constantly vibrating said support back and forth to throw a light horizontally across the path traversed by the vehicle.

2. In a device of the character stated, an oscillatory member, a vertical lamp support rigid therewith, a shaft, means for driving the same by connection with some moving part of a vehicle, and means driven by said shaft for coöperation with said oscillatory member for constantly vibrating said member to oscillate a lamp constantly back and forth across the path traversed by the vehicle.

3. A lamp oscillator, means for driving the same by connection with some moving part of a vehicle said means having a plurality of drives of different speeds each constructed to constantly vibrate a lamp in a plane across the path traversed by the vehicle.

4. A lamp oscillator comprising a shaft constructed to derive motion from a moving part of a vehicle, a lamp support, a cam operated by said shaft, and an oscillatory member actuated by said cam and operatively connected to actuate said support to constantly oscillate a lamp horizontally constantly across the path traversed by the vehicle said support being rigid with said oscillatory member.

5. A lamp oscillator comprising a shaft for continuous revolution by connection with a moving part of a vehicle, a cam actuated by said shaft, and an oscillatory member engageable with said cam and forming a support for a lamp, whereby the lamp may be constantly vibrated across the path traversed by the vehicle the construction and arrangement being such as to prevent wabbling of the lamp due to the motions of the vehicle.

6. A lamp oscillator comprising a plurality of shafts revoluble by connection with a moving part of a vehicle, a cam actuated by rotation of one of said shafts and an oscillatory member at all times having bearings at opposite points on said cam to constantly vibrate a lamp in a plane across the path traversed by the vehicle.

7. A lamp oscillator comprising a shaft revoluble by connection with a moving part of a vehicle, a cam actuated by said shaft and an oscillatory member connectible with a lamp and having arms between which said cam operates, said arms having at all times bearings upon said cam to prevent wabbling of the lamp.

8. A lamp oscillator comprising a shaft revoluble by connection with a moving part of a vehicle, a cam actuated by said shaft, an oscillatory member connectible with a lamp and having arms between which said cam operates, said arms having at all times bearings upon said cam to prevent wabbling of the lamp, and means for disconnecting the lamp to prevent its oscillation when desired.

9. A lamp oscillator comprising a plurality of shafts, a worm on one shaft, a worm gear on another shaft meshing therewith, a cam on the last-named shaft, and an oscillatory member between the arms of which said cam works.

10. A lamp oscillator comprising a plurality of shafts, a worm on one shaft, a worm gear on another shaft meshing therewith, a cam on the last-named shaft, an oscillatory member between the arms of which said cam works, and means for continuously revolving either shaft by connection with a moving part of a vehicle.

11. A lamp oscillator comprising a plurality of shafts, a worm on one shaft, a worm gear on another shaft meshing therewith, a cam on the last-named shaft, an oscillatory member between the arms of which said cam works, means for continuously revolving either shaft by connection with a moving part of a vehicle, and means for attaching a lamp to the shaft of said oscillatory member.

12. A lamp oscillator comprising a plurality of shafts, a worm on one shaft, a worm gear on another shaft meshing therewith, a cam on the last-named shaft, an oscillatory member between the arms of which said cam works, means for continuously revolving either shaft by connection with a moving part of a vehicle, means for attaching a lamp to one of the said shafts of said oscillator, and means for disconnecting the same to allow the shaft to revolve without oscillating the lamp.

13. Means for continuously oscillating a lamp horizontally across the path of a vehicle, comprising a shaft continuously revoluble by connection with a moving part of a vehicle, a cam actuated by said shaft, and an oscillatory member having arms between which said cam is operable, said oscillatory member being carried by a shaft connectible with a lamp.

Signed by me at Lynchburg, Va., this 17th day of February, 1909.

GEORGE PRINTUP.

Witnesses:
L. H. SHACKELFORD,
H. H. MARTIN.